(12) United States Patent
Watanabe et al.

(10) Patent No.: US 8,657,519 B2
(45) Date of Patent: Feb. 25, 2014

(54) BALL JOINT

(71) Applicant: JTEKT Corporation, Osaka (JP)

(72) Inventors: Hajime Watanabe, Kashiwara (JP); Hideo Shibata, Kashiba (JP)

(73) Assignee: JTEKT Corporation, Osaka (JP)

( * ) Notice: Subject to any disclaimer, the term of this patent is extended or adjusted under 35 U.S.C. 154(b) by 0 days.

(21) Appl. No.: 13/676,769

(22) Filed: Nov. 14, 2012

(65) Prior Publication Data

US 2013/0121755 A1 May 16, 2013

(30) Foreign Application Priority Data

Nov. 16, 2011 (JP) ................................ 2011-250588
Nov. 16, 2011 (JP) ................................ 2011-250589

(51) Int. Cl.
*F16C 11/08* (2006.01)
*F16J 15/52* (2006.01)

(52) U.S. Cl.
USPC ............................. 403/134; 403/50; 277/635

(58) Field of Classification Search
USPC ...................... 464/173, 175; 403/50, 51, 134; 277/634–636, 637
See application file for complete search history.

(56) References Cited

U.S. PATENT DOCUMENTS

| | | | | |
|---|---|---|---|---|
| 3,403,932 A | * | 10/1968 | Kutcher | 403/51 |
| 3,506,289 A | * | 4/1970 | Gottschald | 403/51 |
| 4,549,830 A | | 10/1985 | Mette | |
| 5,209,596 A | * | 5/1993 | Matczak et al. | 403/134 |
| 6,152,641 A | * | 11/2000 | Rabe | 403/134 |
| 7,213,814 B2 | * | 5/2007 | Hurlbert et al. | 277/637 X |
| 7,438,493 B2 | * | 10/2008 | Holmes et al. | 403/134 |
| 7,959,161 B2 | * | 6/2011 | Seki et al. | 277/637 X |
| 2006/0153632 A1 | * | 7/2006 | Bernhardt et al. | |
| 2006/0182491 A1 | * | 8/2006 | Bernhardt et al. | 403/134 |

FOREIGN PATENT DOCUMENTS

| | | |
|---|---|---|
| JP | U 61-84273 | 6/1986 |
| JP | U 3-99217 | 10/1991 |
| JP | U 6-78617 | 11/1994 |
| JP | A-2004-36700 | 2/2004 |

OTHER PUBLICATIONS

Feb. 27, 2013 Extended Search Report issued in European Patent Application No. EP 12 19 2617.

* cited by examiner

*Primary Examiner* — Gregory Binda
*Assistant Examiner* — Josh Skroupa
(74) *Attorney, Agent, or Firm* — Oliff PLC

(57) ABSTRACT

An annular groove, in which a lower end of a boot is fitted, is formed in an outer periphery of an open end of a housing so as to extend in a circumferential direction of the housing. The annular groove is defined by a cylindrical face, an upper inner wall, and a lower inner wall. By fitting a clip onto a cylindrical portion of the lower end of the boot, the cylindrical portion is pushed against the cylindrical face, and an inner end portion and a folded-back portion are pushed against the upper inner wall and the lower inner wall, respectively. The inner end portion has an annular protrusion that is engaged with the upper inner wall and elastically contracted when the lower end of the boot is fitted in the annular groove.

6 Claims, 4 Drawing Sheets

BALL JOINT

INCORPORATION BY REFERENCE

The disclosure of Japanese Patent Applications No. 2011-250588 filed on Nov. 16, 2011 and No. 2011-250589 filed on Nov. 16, 2011 each including the specification, drawings and abstract, is incorporated herein by reference in its entirety.

BACKGROUND OF THE INVENTION

1. Field of the Invention

The invention relates to a ball joint.

2. Description of Related Art

For example, at a junction between a knuckle arm of a suspension and a steering device, there is provided a ball joint (so-called outer ball joint) that supports the knuckle arm such that the knuckle arm is steerable and movable in the up-down direction. Some of such ball joints include a metal ball stud, a closed-end cylindrical housing, a resin seat made of synthetic resin, and a tubular rubber boot (dust boot) (See Japanese Patent Application Publication No. 2004-36700 (JP 2004-36700 A)). The ball stud includes a spherical head provided at a base end of its shaft. The housing holds the spherical head therein with the shaft projected from an opening of the housing. The resin seat is placed between the housing and the spherical head. The boot (dust boot) is attached to the housing. The ball stud is able to oscillate about the spherical head with respect to the housing, and is also able to rotate about the central axis of the shaft.

The boot covers the opening of the housing, and prevents dirt and water from entering the housing through the junction between the knuckle arm and the steering device. One end and the other end of the boot are fitted onto an open end of the housing (the end at which the opening is formed) and a middle portion of the shaft, respectively. Grease is provided between the resin seat and the spherical head, so the grease is sealed in the boot.

According to JP 2004-36700 A, an annular groove for fitting the boot to the housing is formed in the outer periphery of the open end of the housing, and one end of the boot is fitted in the annular groove. Further, an annular clip is wound around the one end of the boot. The one end of the boot is fixed to the housing by the clip. The annular groove is formed to have a generally rectangular shape in a section orthogonal to the radial direction thereof.

In the above-described ball joint, the ball stud oscillates with respect to the housing about the spherical head which acts as a fulcrum. The other end of the boot (the end portion of the boot, which is fitted onto the middle portion of the shaft) moves together with the shaft as the ball stud oscillates. Therefore, when the ball stud oscillates greatly, a portion of the boot, which is located on the side on which the shaft is tipped, is contracted, and another portion of the boot, which is located on the side opposite to the side on which the shaft is tipped, is stretched toward the other end side. Hence, as the ball stud oscillates, a load, which causes the one end (the end portion of the boot, which is fitted onto the open end of the housing) of the boot to move within the annular groove, is applied to the one end of the boot. If the one end of the boot, which is fitted in the annular groove, moves, the one end of the boot catches the grease sealed in the boot. This may cause leakage of the grease from the boot through the annular groove. In this case, the grease leaks from the boot because the one end of the boot moves easily within the annular groove. In order to reliably prevent leakage of the grease from the boot, it is desirable to increase a force for fixing the one end of the boot to the outer periphery of the housing.

In cold regions in particular, the viscosity of grease increases, and a significantly high load is required to tilt the ball stud and the boot. Therefore, when the ball stud oscillates, a load applied to the one end of the boot is significantly high, and the one end of the boot is displaced by a larger amount. Hence, in cold regions, the possibility of leakage of the grease from the boot may be high.

In order to prevent leakage of the grease from the boot, it is desirable that the one end of the boot and the end of the housing be in tight contact with each other and the other end of the boot and the middle portion of the shaft be in tight contact with each other. In order to achieve tighter contact between the one end of the boot and the end of the housing, for example, the surface roughness of the bottom face and a pair of side faces of the annular groove may be set relatively low (for example, the arithmetic mean roughness Ra may be set to a value lower than 12.5 μm).

The inventors of the invention have considered increasing the surface roughness of all the inner walls of the annular groove so that the frictional resistance between the one end of the boot and each of the inner walls of the annular groove is increased, thereby increasing a force for fixing the one end of the boot to the outer periphery of the housing. Thus, movement of the one end of the boot within the annular groove is suppressed.

However, if the surface roughness of the inner walls of the annular groove is high, small clearances may be formed between the inner walls and the one end of the boot. Therefore, increasing the surface roughness in all of the inner walls of the annular groove may cause leakage of the grease from the boot through the small clearances between the inner walls and the end of the boot.

Meanwhile, as described above, a portion of the boot, which is located on the side on which the shaft tips, is contracted due to oscillation of the ball stud. Due to the contraction of the boot, a middle portion of the boot moves toward one side in the axial direction of the housing, and a clearance is formed between the side face of the annular groove and the one end of the boot. As a result, the grease in the boot may enter the clearance and then leak from the boot.

SUMMARY OF THE INVENTION

An object of the invention is to provide a ball joint that reliably prevents leakage of grease from a boot.

An aspect of the invention relates to a ball joint, including: a ball stud that has a shaft and a spherical head provided at one end of the shaft; a tubular housing that has an opening, and that holds therein the spherical head with the shaft projected from the opening; an elastic tubular boot that is fitted at one end onto an end portion of the housing and fitted at the other end onto a middle portion of the shaft, thereby covering the opening; and a fixing ring that is fitted onto the one end of the boot to fix the one end of the boot to the end portion of the housing. An annular groove, in which the one end of the boot is fitted, is formed in an outer periphery of the end portion of the housing so as to extend in a circumferential direction of the housing. The annular groove has a cylindrical bottom face, and an annular first side face that connects a first end of the bottom face in an axial direction of the housing to an outer periphery of the housing. The one end of the boot is formed in an annular shape, and has a first portion that faces the bottom face and a second portion that faces the first side face, and when the fixing ring is fitted onto the first portion, the first portion is pushed against the bottom face and the second portion is pushed against the first side face. The second portion has an annular protrusion that is engaged with the first side face and elastically contracted when the one end of the boot is fitted in the annular groove.

BRIEF DESCRIPTION OF THE DRAWINGS

The foregoing and further features and advantages of the invention will become apparent from the following description of the example embodiments with reference to the accompanying drawings, wherein like numerals are used to represent like elements and wherein.

DETAILED DESCRIPTION OF EMBODIMENTS

Hereinafter, a first embodiment of the invention will be described in detail with reference to the accompanying drawings.

Figure 1:
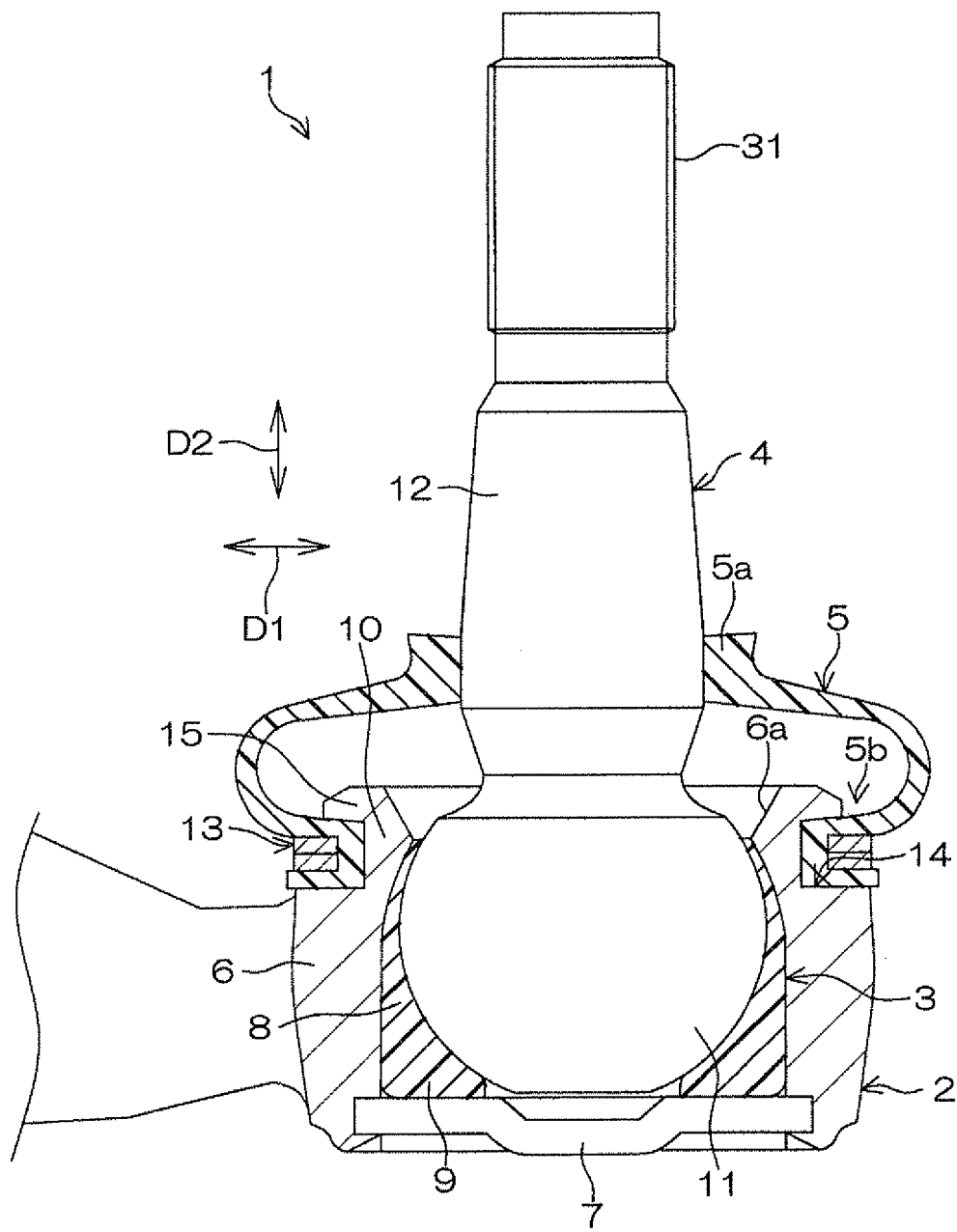
FIG. 1 is a partial sectional view showing the structure of a ball joint according to an embodiment of the invention.

FIG. 1 is a partial sectional view showing the structure of a ball joint 1 according to the embodiment of the invention. The ball joint 1 is provided, for example, at a junction between a knuckle arm for a suspension (not shown) and a steering device, and functions as an outer ball joint. The ball joint 1 supports the knuckle arm such that the knuckle arm is steerable and movable in the up-down direction. The ball joint 1 includes a tubular housing 2, a resin seat 3, a ball stud 4, and a tubular boot 5. The resin seat 3 and the ball stud 4 are held inside the housing 2. The boot 5 is attached to the housing 2. The housing 2 includes a tubular member 6, and a plug plate 7 that is fixed to the lower end of the tubular member 6 so as to close the lower end. The resin seat 3 is arranged inside the tubular member 6. The upper end of the tubular member 6 is an open end (end portion) 6a.

The resin seat 3 has a cup shape, and includes a tubular peripheral wall portion 8 and a bottom portion 9 that is provided at the lower end of the peripheral wall portion 8. The resin seat 3 is arranged such that the peripheral wall portion 8 is located along the inner periphery of the tubular member 6 and the bottom portion 9 faces the plug plate 7. The resin seat 3 is held between an annular rib portion 10 provided at the open end 6a and the plug plate 7. The inner diameter of the rib portion 10 is smaller than the outer diameter of a part (a spherical head 11 described later) of the ball stud 4. The part of the ball stud 4 and the resin seat 3 are retained within the tubular member 6 by the rib portion 10.

The ball stud 4 is a metal member in which the spherical head 11 and a shaft 12 are integrally formed. The spherical head 11 has a spherical outer periphery. The shaft 12 projects from the spherical head 11 upward (in a direction away from the spherical head 11 along an axial direction D2 of the housing 2). The spherical head 11 is arranged such that the center thereof is located on the central axis of the shaft 12. In a distal end portion of the shaft 12, an external thread portion 31, which is screwed to the knuckle arm, is formed. The spherical head 11 is covered with the resin seat 3, inside the tubular member 6. The shaft 12 projects from the open end 6a of the tubular member 6. Most part of the spherical head 11 except a part near the shaft 12 is covered by the resin seat 3. The spherical head 11 is held by the housing 2 via the resin seat 3.

The inner periphery of the resin seat 3 has a shape that conforms to the outer periphery of the spherical head 11. Grease is provided between the resin seat 3 and the spherical head 11. The grease is semisolid at ambient temperatures and has almost no fluidity. The spherical head 11 is slidable with respect to the resin seat 3, and the ball stud 4 is able to oscillate with respect to the housing 2 about the spherical head 11 that serves as a fulcrum. Further, the ball stud 4 is able to rotate around the axis of the shaft 12.

The boot 5 is formed in a tubular shape in which an upper end (other end) 5a is smaller in diameter than a lower end (one end) 5b, and a middle portion thereof bulges outward with respect to the lower end 5b. The boot 5 is made of an elastic material (e.g. chloroprene rubber (CR), arylonitrile-butadiene rubber (NBR), and natural rubber). The aforementioned grease is sealed in the boot 5. The upper end 5a of the boot 5 is fitted onto the middle portion of the shaft 12, and the lower end 5b of the boot 5 is fitted onto the open end 6a of the tubular member 6. The lower end 5b of the boot 5 is fixed to the tubular member 6 by a clip (fixing member) 13 that is attached to the lower end 5b. An opening formed on the inner side of the open end 6a is covered with the boot 5. Thus, foreign matters such as dirt and water are prevented from entering the ball joint 1.

As the ball stud 4 oscillates with respect to the housing 2 about the spherical head 11 that serves as a fulcrum, the upper end 5a of the boot 5 moves together with the shaft 12 in accordance with the oscillation of the ball stud 4. Therefore, when the ball stud 4 oscillates greatly, a portion of the boot 5, which is located on the side on which the shaft 12 tips, is contracted, and another portion of the boot 5, which is located on the side opposite to the side on which the shaft 12 tips, is stretched toward the other end side. Therefore, in accordance with the oscillation of the ball stud 4, a load, which causes the lower end 5b to move within the annular groove 14, is applied to the lower end 5b of the boot 5.

Figure 2:
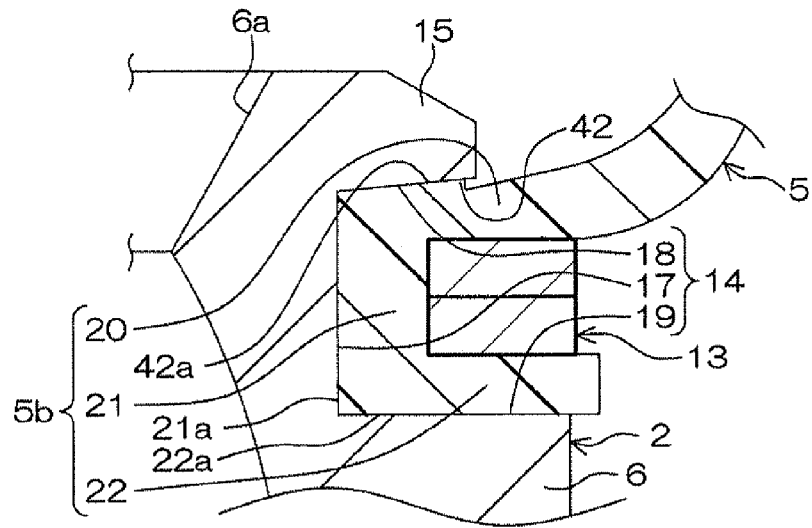
FIG. 2 is an enlarged sectional view showing part of the ball joint according to a first embodiment of the invention.
Figure 3:
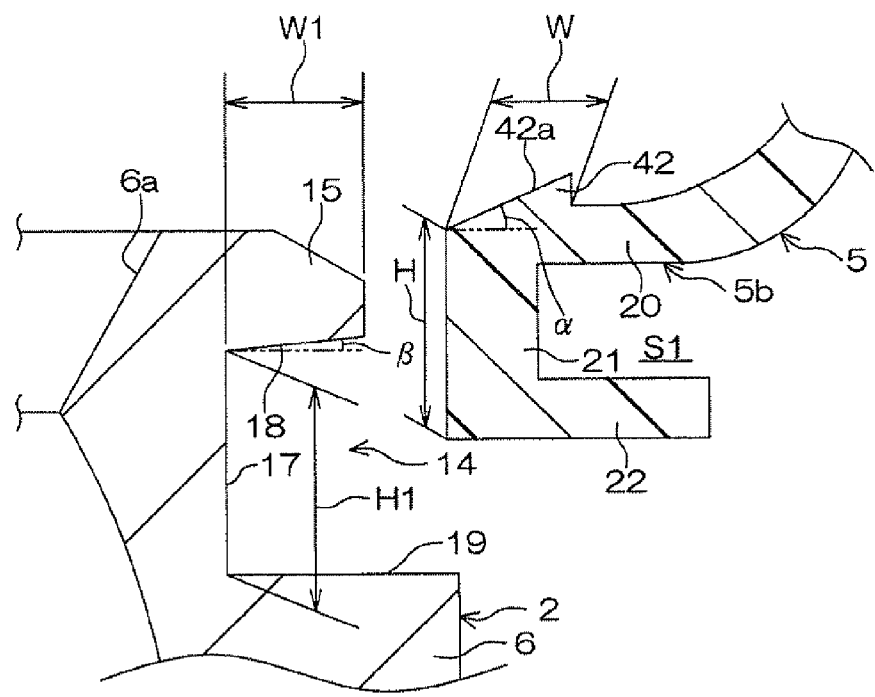
FIG. 3 is a sectional view showing a first middle process of the assembly of the ball joint shown in FIG. 2.
Figure 4:
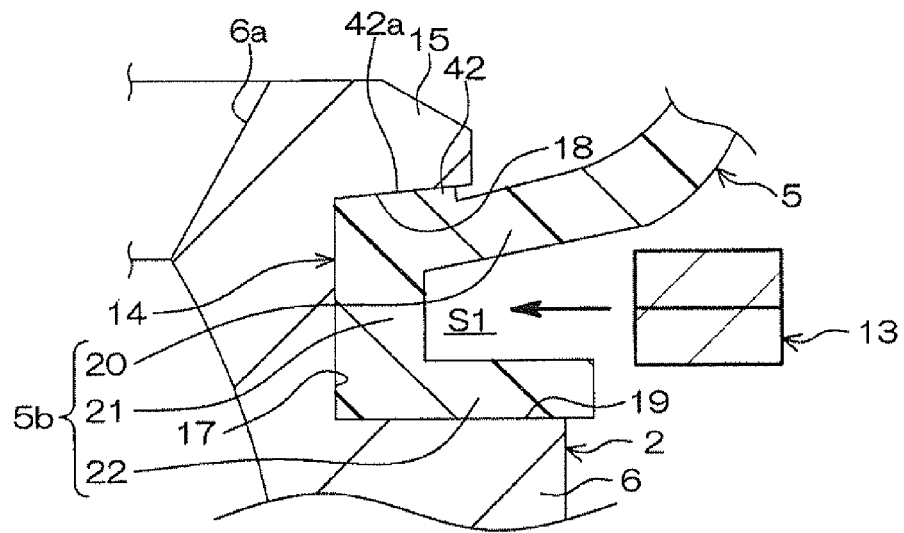
FIG. 4 is a sectional view showing a second middle process of the assembly of the ball joint shown in FIG. 2.

FIG. 2 is an enlarged sectional view of part of the ball joint 1 according to the first embodiment, which is near the open end 6a of the housing 2. FIG. 3 and FIG. 4 are views showing middle processes of the assembly of the ball joint 1. With reference to FIG. 1 to FIG. 4, a structure for fitting the boot 5 to the open end 6a of the housing 2 will be described. In the outer periphery of the open end 6a of the housing 2, the annular groove 14 for fitting the boot 5 to the housing 2 is formed. The annular groove 14 extends in the circumferential direction of the outer periphery of the open end 6a. The housing 2 has an annular projection 15 that extends in the circumferential direction of the housing 2. The annular groove 14 is defined by a cylindrical face (bottom face) 17, an annular upper inner wall (first side face) 18, and an annular lower inner wall (second side face) 19. The cylindrical face 17 extends along the vertical direction (the direction in which the central axis of the tubular member 6 extends). The upper inner wall 18 connects an upper end of the cylindrical face 17 (a first end in the direction along the axial direction D2 of the housing 2) to the outer periphery of the housing 2. The lower inner wall 19 connects a lower end of the cylindrical face 17 (a second end in the direction along the axial direction D2 of the housing 2) to the outer periphery of the housing 2. The upper inner wall 18 is formed as a sloping face that slopes upward in a direction toward the radially outer side. The angle of slope of the upper inner wall 18 with respect to the lateral direction (the radial direction D1 of the housing 2; shown by a long dashed double-short dashed line) is denoted by β (see FIG. 3). The lower inner wall 19 extends along the radial direction D1 of the housing 2.

The annular projection 15 projects outward from the open end 6a along the radial direction D1 of the housing 2. The annular groove 14 is formed below the annular projection 15. The outer edge of the annular projection 15 is located inward of the outer edge of the housing 2 in the radial direction D1 of the housing 2. The lower end 5b of the boot 5 is fitted in the annular groove 14 while being in tight contact with the entireties of the cylindrical face 17, the upper inner wall 18, and the lower inner wall 19. The lower end 5b of the boot 5 has an annular inner end portion (second portion) 20, a cylindrical portion (first portion) 21, and an annular folded-back portion 22. The inner end portion 20 is a lower end portion of the tubular middle portion of the boot 5. The cylindrical portion 21 is formed to be contiguous with the inner end (distal end) of the inner end portion 20. The folded-back portion 22 is folded back so as to extend outward in the radial direction D1 from the distal end of the cylindrical portion 21.

The cylindrical portion 21 is located inside the annular groove 14 with its inner periphery in tight contact with the cylindrical face 17. A vertical width H of the cylindrical portion 21 is smaller than a vertical width H1 of the cylindrical face 17. The vertical width H of the cylindrical portion 21 is a vertical width of the inner peripheral end of the lower end 5b of the boot 5, and is also a width of the cylindrical portion 21 in the axial direction D2 of the housing 2 (see FIG. 3). The vertical width H1 of the cylindrical face 17 is a width of the cylindrical face 17 in the axial direction D2 of the housing 2 (see FIG. 3).

The inner end portion 20 has a body 41 and an annular protrusion 42. The body 41 forms a tapered face (side face of a circular cone having a vertex in the direction toward the central axis of the housing 2). The annular protrusion 42 is formed on an upper side portion of the body 41. The annular protrusion 42 in a free state (state where no load is applied to the annular protrusion 42) has a so-called "barb" shape with respect to the body 41. In other words, the annular protrusion 42 in the free state has a right triangle sectional shape in which the angle on the upper side (in the axial direction D2 of the housing 2) is an acute angle and the angle on the lower outer side is a right angle. More specifically, an upper face 42a of the annular protrusion 42 (a surface that forms the hypotenuse of the right triangle) is formed as a sloping face that slopes upward in the direction toward the radially outer side. An angle of slope of the upper face 42a with respect to the lateral direction (the radial direction D1 of the housing 2; shown by the chain double-dotted line in FIG. 3) is set to α (see FIG. 3; α>β). A value obtained by subtracting β from α (α−β) may be set to a value within a range from 3° to 15°. A radial width W of the annular protrusion 42 is smaller than a projection amount W1, by which the annular projection 15 projects from the cylindrical face 17 of the annular groove 14. As shown in FIG. 2, when the lower end 5b of the boot 5 is fitted in the annular groove 14, the annular protrusion 42 is engaged with the upper inner wall 18 and contracted elastically (deformed so as to be crushed).

A lower face 22a of the folded-back portion (see FIG. 2) is located in the annular groove 14 while being in tight contact with the lower inner wall 19. In the free state, the inner end portion 20, the cylindrical portion 21, and the folded-back portion 22 are formed in an annular shape with a substantially U-shaped section as a whole. Also, an annular arrangement space S1 having a generally rectangular sectional shape is formed between the inner end portion 20 and the folded-back portion 22. The inner diameter of the cylindrical portion 21 in the free state is smaller than the outer diameter of the cylindrical face 17.

The clip 13 is, for example, a double winding steel spring member that has an annular shape in a plan view. The clip 13 is formed to have a rectangular sectional shape. The clip 13 is arranged in the arrangement space S1 within the annular groove 14, and fitted to the outer periphery of the cylindrical portion 21. In this state, the clip 13 tightens the cylindrical portion 21 in such a direction that the diameter of the cylindrical portion 21 is reduced, and an inner periphery 21a of the cylindrical portion 21 is pushed against the cylindrical face 17. Hence, the cylindrical portion 21 is fixed to the tubular member 6. Further, due to the clip 13 arranged in the arrangement space S1, the inner end portion 20 and the folded-back portion 22 are pushed in such directions that the inner end portion 20 and the folded-back portion 22 move away from each other. Therefore, as the upper face 42a of the annular protrusion 42 of the inner end portion 20 is pushed against the upper inner wall 18, the annular protrusion 42 is elastically contracted, and, at the same time, the lower face 22a of the folded-back portion 22 is pushed against the lower inner wall 19.

When the boot 5 is fitted to the housing 2 from the free state shown in FIG. 3, the lower end 5b (the cylindrical portion 21) of the boot 5 is stretched outward and then fitted onto the annular projection 15. Then, the lower end 5b of the boot 5 is moved downward so that the inner end portion 20, the cylindrical portion 21, and the folded-back portion 22 are fitted into the annular groove 14. At this time, the thickness of the middle portion of the boot 5, which is close to the lower end 5b thereof, is sufficiently small, and therefore the boot 5 is easily fitted to the housing 2.

Once the entirety of the cylindrical portion 21 is fitted into the annular groove 14, the diameter of cylindrical portion 21 is reduced by resilience due to the elasticity of the boot 5. As a result, as illustrated in FIG. 4, the cylindrical portion 21 is placed below the annular projection 15, and the inner periphery of the cylindrical portion 21 is brought into tight contact with the cylindrical face 17. Further, the upper face 42a of the annular protrusion 42 of the inner end portion 20 contacts the upper inner wall 18. Once the entirety of the folded-back portion 22 is fitted into the annular groove 14, the arrangement space S1 in which the clip 13 is arranged is defined by the inner end portion 20, the cylindrical portion 21, and the folded-back portion 22. Accordingly, as shown in FIG. 4, it is possible to arrange the clip 13 in the arrangement space S1 by placing, through the opening of the annular groove 14, the clip 13 into the annular groove 14 in which the lower end 5b of the boot 5 is already inserted.

As a result, the clip 13 is fitted onto the cylindrical portion 21, and the inner periphery 21a of the cylindrical portion 21 is pushed against the cylindrical face 17. Moreover, the annular protrusion 42 of the inner end portion 20 is pushed against the upper inner wall 18 and contracted elastically, and is therefore deformed so as to be crushed. Therefore, when the lower end 5b of the boot 5 is fitted in the annular groove 14, a large interference is ensured in the inner end portion 20. As a result, a pushing force applied to the upper inner wall 18 (pushing force applied by the annular protrusion 42 to the upper inner wall 18) is increased. Therefore, a frictional force generated between the inner end portion 20 (the annular protrusion 42) and the upper inner wall 18 is relatively large. Due to this, a binding force is applied in the vertical direction (the axial direction D2 of the housing 2). As a result, a force for fixing the lower end 5b of the boot 5 to the outer periphery of the housing 2 is increased, and movement of the lower end 5b of the boot 5 is suppressed or prevented. This inhibits or prevents the lower end 5b of the boot 5 from catching the grease, thus preventing leakage of the grease due to movement of the lower end 5b of the boot 5.

Figure 5:
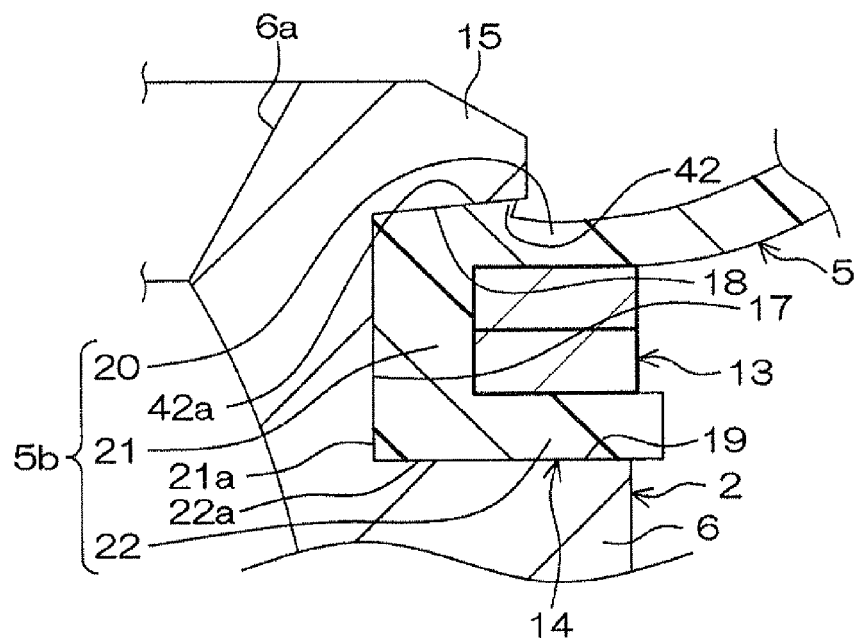
FIG. 5 is a sectional view showing a state where a ball stud has been oscillated in the ball joint shown in FIG. 2.

FIG. 5 is a sectional view showing a state where the ball stud 4 has been oscillated in the ball joint 1. As illustrated in FIG. 5, even if the middle portion of the boot 5 moves downward (toward one side in the axial direction D2 of the housing 2) in accordance with the oscillation the ball stud 4, the annular protrusion 42 is elastically deformed in accordance with the movement of the boot 5 and restored to its original state. As a result, it is possible to maintain tight contact between the inner end portion 20 (the annular protrusion 42) and the upper inner wall 18. Therefore, it is possible to prevent or suppress entry of the grease between the inner end portion 20 (the annular protrusion 42) and the upper inner wall 18. Thus, it is possible to reliably prevent leakage of the grease from the boot 5.

Figure 6:
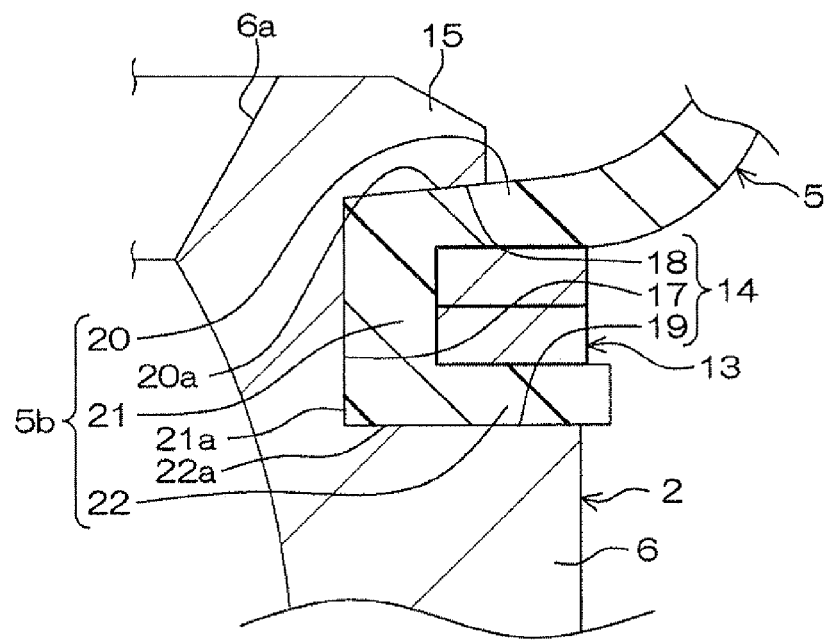
FIG. 6 is an enlarged sectional view of part of a ball joint according to a second embodiment of the invention.
Figure 7:
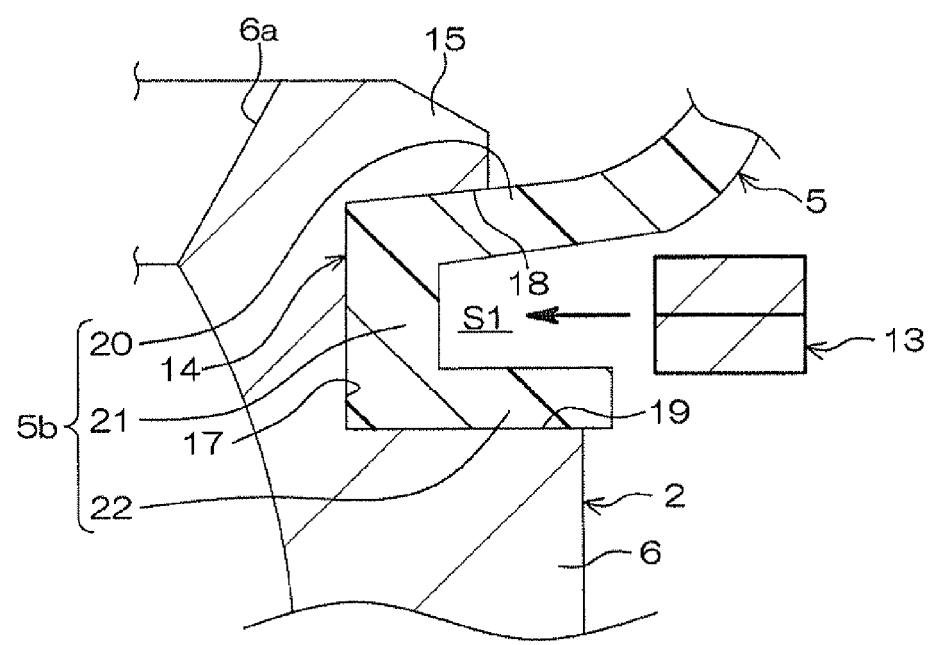
FIG. 7 is a sectional view showing a middle process of the assembly of the ball joint shown in FIG. 6.

Next, a ball joint according to a second embodiment of the invention will be described in detail with reference to the accompanying drawings. FIG. 6 is an enlarged sectional view of part of the ball joint 1 according to the second embodiment of the invention, which is close to the open end 6a of the housing 2. FIG. 7 is a sectional view showing a middle process of the assembly of the ball joint shown in FIG. 6. A structure for fitting the boot 5 to the open end 6a of the housing 2 will be described with reference to FIG. 1, FIG. 6, and FIG. 7. Note that, in FIG. 6 and FIG. 7, members having the same or similar functions as those described in FIG. 1 to FIG. 5 will be denoted by the same reference numerals, and the detail description thereof will be omitted.

As shown in FIG. 1, the upper end 5a of the boot 5 moves together with the shaft 12 as the ball stud 4 oscillates about the spherical head 11 which serves as a fulcrum. Hence, when the ball stud 4 oscillates greatly, a portion of the boot 5 (a portion in the circumferential direction), which is located on the side opposite to the side on which the shaft 12 tips, is stretched toward the upper end 5a of the boot 5. Thus, together with the portion of the boot 5, a portion of the lower end 5b of the boot 5 is stretched toward the upper end 5a of the boot 5, a load that removes the lower end 5b of the boot 5 from the tubular member 6 is applied to the boot 5.

As shown in FIG. 6, an annular groove 14 for fitting the boot 5 to the housing 2 is formed in the outer periphery of the open end 6a of the housing 2. The annular groove 14 extends in the circumferential direction of the outer periphery of the open end 6a. Also, the housing 2 has the annular projection 15 that extends in the circumferential direction of the housing 2. The annular groove 14 is defined by the cylindrical face (bottom face) 17, the annular upper inner wall (first side face) 18, and the annular lower inner wall (second side face) 19. The cylindrical face 17 extends along the vertical direction (the direction in which the central axis of the tubular member 6 extends). The upper inner wall 18 connects the upper end of the cylindrical face 17 (a first end in the axial direction D2 of the housing 2) to the outer periphery of the housing 2. The lower inner wall 19 connects the lower end of the cylindrical face 17 (a second end in the axial direction D2 of the housing 2) to the outer periphery of the housing 2. The upper inner wall 18 is formed as a sloping face that slopes upward in a direction toward the radially outer side. The lower inner wall 19 extends along the radial direction D1 of the housing 2.

An arithmetic mean roughness Ra of the cylindrical face 17 is a given value that is equal to or greater than 12.5 μm and less than 100 μm (for example, approximately 12.5 μm). An arithmetic mean roughness Ra (μm) of the upper inner wall 18 is a given value less than 12.5 μm (for example, approximately 3 μm). An arithmetic mean roughness Ra of the lower inner wall 19 is a given value less than 12.5 μm (for example, approximately 3 μm). In other words, the cylindrical face 17 is rougher than the upper inner wall 18 and the lower inner wall 19. The inner walls 17, 18, 19 of the annular groove 14 may be made different in surface roughness from each other by changing the feed speed of a machine during finish processing on the inner walls 17, 18, 19 of the annular groove 14.

The annular projection 15 projects outward from the open end 6a along the radial direction D1 of the housing 2. The annular groove 14 is formed below the annular projection 15. The outer edge of the annular projection 15 is located inward of the outer edge of the housing 2 in the radial direction D1 of the housing 2. The lower end 5b of the boot 5 is fitted in the annular groove 14 while being in tight contact with the entireties of the cylindrical face 17, the upper inner wall 18, and the lower inner wall 19. The lower end 5b of the boot 5 has the inner end portion (second portion) 20, the cylindrical portion (first portion) 21, and the annular folded-back portion 22. The inner end portion 20 is a lower end portion of the tubular middle portion of the boot 5. The cylindrical portion 21 is formed to be contiguous with the inner end (distal end) of the inner end portion 20. The folded-back portion 22 is folded back so as to extend outward in the radial direction D1 from the distal end of the cylindrical portion 21. The cylindrical portion 21 has substantially the same axial length as the cylindrical face 17, and is located inside the annular groove 14 with its inner periphery in tight contact with the cylindrical face 17. The inner end portion 20 is located inward of the annular projection 15, and is located inside the annular groove 14 with its upper face 20a (see FIG. 6) in tight contact with the upper inner wall 18. The folded-back portion 22 (see FIG. 6) is located inside the annular groove 14 with its lower face 22a in tight contact with the lower inner wall 19. The inner end portion 20, the cylindrical portion 21, and the folded-back portion 22 are formed into an annular shape with a substantially U-shaped section as a whole. An annular arrangement space S1 having a generally rectangular sectional shape is formed between the inner end portion 20 and the folded-back portion 22. The inner diameter of the cylindrical portion 21 in a free state (state where no load is applied to the cylindrical portion 21) is smaller than the outer diameter of the cylindrical face 17.

The clip 13 is, for example, a double winding steel spring member that has an annular shape in a plan view. The clip 13 is formed to have a rectangular sectional shape. The clip 13 is arranged in the arrangement space S1 within the annular groove 14, and fitted to the outer periphery of the cylindrical portion 21. In this state, the clip 13 tightens the cylindrical portion 21 in such a direction that the diameter of the cylindrical portion 21 is reduced, and the inner periphery 21a of the cylindrical portion 21 is pushed against the cylindrical face 17. Hence, the cylindrical portion 21 is fixed to the tubular member 6. Further, due to the clip 13 arranged in the arrangement space S1, the inner end portion 20 and the folded-back portion 22 are pushed in such directions that the inner end portion 20 and the folded-back portion 22 move away from each other. Therefore, the upper face 20a of the inner end portion 20 is pushed against the upper inner wall 18, and the lower face 22a of the folded-back portion 22 is pushed against the lower inner wall 19.

As shown in FIG. 7, when the boot 5 is fitted to the housing 2, the lower end 5b (the cylindrical portion 21) of the boot 5 is stretched outward and then fitted onto the annular projection 15. Then, the lower end 5b of the boot 5 is moved downward so that the inner end portion 20, the cylindrical portion 21, and the folded-back portion 22 are fitted into the annular groove 14. Once the entirety of the cylindrical portion 21 is fitted into the annular groove 14, the diameter of cylindrical portion 21 is reduced by resilience due to the elasticity of the boot 5. As a result, as illustrated in FIG. 7, the cylindrical portion 21 is placed below the annular projection 15, and the inner periphery of the cylindrical portion 21 is brought into tight contact with the cylindrical face 17. Once the entirety of the folded-back portion 22 is fitted in the annular groove 14, the arrangement space S1 in which the clip 13 is arranged is defined by the inner end portion 20, the cylindrical portion 21, and the folded-back portion 22. Accordingly, as shown in FIG. 7, it is possible to arrange the clip 13 in the arrangement space S1 by placing, through the opening of the annular groove 14, the clip 13 into the annular groove 14 in which the lower end 5*b* of the boot 5 is already inserted.

Thus, the clip 13 is fitted onto the cylindrical portion 21 and the inner periphery 21*a* of the cylindrical portion 21 is pushed against the cylindrical face 17. Thus, the lower end 5*b* of the boot 5 is fixed to the open end 6*a* of the tubular member 6. In addition, due to the clip 13 arranged in the arrangement space S1, the inner end portion 20 and the folded-back portion 22 are pushed in such directions that the inner end portion 20 and the folded-back portion 22 move away from each other. Therefore, even when the ball stud 4 oscillates greatly and a load that removes the lower end 5*b* of the boot 5 from the annular groove 14 is applied to the boot 5, it is possible to reliably prevent the boot 5 from being removed from the housing 2.

According to the present embodiment described above, the cylindrical face 17 is rougher than the upper inner wall 18 and the lower inner wall 19. The clip 13 is arranged in the arrangement space S1 in the lower end 5*b* of the boot 5 fitted into the annular groove 14, and the clip 13 is fitted onto the cylindrical portion 21. This clip 13 tightens the cylindrical portion 21 in such a direction that the diameter of the cylindrical portion 21 is reduced. Therefore, the inner periphery 21*a* of the cylindrical portion 21 is pushed against the cylindrical face 17. Moreover, due to the clip 13 arranged in the arrangement space S1, the inner end portion 20 and the folded-back portion 22 are pushed in such directions that the inner end portion 20 and the folded-back portion 22 move away from each other. Then, the upper face 20*a* of the inner end portion 20 and the lower face 22*a* of the folded-back portion 22 are pushed against the upper inner wall 18 and the lower inner wall 19, respectively.

A tightening force applied by the clip 13 acts mainly on the cylindrical face 17, and the surface roughness of the cylindrical face 17 is high. Therefore, a relatively large frictional force acts between the lower end 5*b* of the boot 5 and the cylindrical face 17. As a result, a force for fixing the lower end 5*b* of the boot 5 to the outer periphery of the housing 2 is increased. Accordingly, movement of the lower end 5*b* of the boot 5 is suppressed or prevented, and the lower end 5*b* of the boot 5 is thus inhibited or prevented from catching grease. Hence, leakage of the grease due to the movement of the lower end 5*b* of the boot 5 is prevented.

Further, because the surface roughness of the upper inner wall 18 is low, the inner end portion 20 of the lower end 5*b* of the boot 5 and the upper inner wall 18 are in tight contact with each other. As described above, because the surface roughness of the cylindrical face 17 is relatively high, if grease is present between the cylindrical face 17 and the cylindrical portion 21, the grease may leak from the boot 5 through clearances between the cylindrical face 17 and the cylindrical portion 21. However, because the inner end portion 20 of the boot 5 and the upper inner wall 18 are in tight contact with each other, the grease in the boot 5 is unlikely to reach the clearances between the cylindrical face 17 and the cylindrical portion 21. Hence, even when the cylindrical face 17 is rough, leakage of the grease due to the rough cylindrical face 17 is prevented.

With the above-described configuration, it is possible to reliably prevent leakage of the grease from the boot 5. Moreover, because the surface roughness of the lower inner wall 19 is low, the folded-back portion 22 of the lower end 5*b* of the boot 5 and the lower inner wall 19 are in tight contact with each other. Therefore, it is possible to reliably prevent, for example, mud water from entering the boot 5

Although the embodiments of the invention have been described above, the above-described embodiment may be combined with each other. In addition, the invention may be implemented in other embodiments. For example, a portion of the cylindrical face 17 in the axial direction may have a high surface roughness, and the remaining portion of the cylindrical face 17 may have a low surface roughness. However, even in this case, it is desirable that a portion of the cylindrical face 17 that extends all around the cylindrical face 17 in the circumferential direction have a high surface roughness.

In the first embodiment, the vertical width H of the cylindrical portion 21 (see FIG. 3), in other words, the vertical width of the lower end 5*b* of the boot 5 at its inner peripheral end may be substantially equal to the vertical width H1 of the cylindrical face 17 (see FIG. 3).

In the first embodiment, the radial width W of the annular protrusion 42 is smaller than the projection amount W1, by which the annular projection 15 projects from the cylindrical face 17. However, the radial width W of the annular protrusion 42 may be set greater than the projection amount W1 of the annular projection 15.

A double winding spring member which has a rectangular sectional shape is used as an example of the clip 13. However, the clip 13 may be a single-winding or triple-winding spring member, or may have a circular or elliptical sectional shape.

In the above embodiments, the ball joint 1 is attached to the knuckle arm for a suspension. However, the invention may be applied to a ball joint 1 that is attached to a knuckle arm for a steering device. Note that various other design changes may be made within the scope of claims.

According to the invention, it is possible to provide a ball joint that reliably prevents leakage of grease from a boot.

What is claimed is:

1. A ball joint, comprising:
    a ball stud that has a shaft and a spherical head provided at one end of the shaft;
    a tubular housing that has an opening, and that holds therein the spherical head with the shaft projected from the opening;
    an elastic tubular boot that is fitted at one end onto an end portion of the housing and fitted at the other end onto a middle portion of the shaft, thereby covering the opening; and
    a fixing ring that is fitted onto the one end of the boot to fix the one end of the boot to the end portion of the housing, wherein
    an annular groove, in which the one end of the boot is fitted, is formed in an outer periphery of the end portion of the housing so as to extend in a circumferential direction of the housing,
    the housing has an annular projection that extends in the circumferential direction of the housing, the annular groove has a cylindrical bottom face, and an annular first side face that connects a first end of the bottom face in an axial direction of the housing to an outer periphery of the housing, the annular first side face is formed as a sloping face that slopes upward in a direction toward the radially outer side, the one end of the boot is formed in an annular shape, and has a first portion that faces the bottom face and a second portion that faces the first side face, and when the fixing ring is fitted onto the first portion, the first portion is pushed against the bottom face and the second portion is pushed against the first side face, the second portion has an annular protrusion that is engaged with the first side face and elastically contracted when the one end of the boot is fitted in the annular groove, and an upper surface of the annular protrusion is formed as a sloping face that slopes upward in a direction toward the radially outer side, the annular protrusion has a triangular sectional shape one side of which extends in the radial direction of the housing, and a radial width of the annular protrusion is smaller than a projection amount of the annular projection, such that the annular projection projects from the cylindrical face of the annular groove when the one end of the boot is fitted in the annular groove, and an inclination angle of the upper surface of the annular protrusion with respect to a lateral direction is greater than an inclination angle of the first side face with respect to a lateral direction.

2. The ball joint according to claim 1, wherein a width of the first portion in the axial direction of the housing is equal to or smaller than a width of the bottom face in the axial direction of the housing.

3. The ball joint according to claim 1, wherein at least a portion of the bottom face of the annular groove is formed to be rougher than the first side face.

4. The ball joint according to claim 3, wherein:

the annular groove has an annular second side face that connects a second end of the bottom face in the axial direction of the housing to the outer periphery of the housing;

the one end of the boot is formed into an annular shape with a U-shaped cross section, and has the first portion, the second portion, and a third portion that faces the second side face;

the fixing ring is arranged in an arrangement space that is defined by the first portion, the second portion, and the third portion; and at least a portion of the bottom face is higher in surface roughness than each of the first side face and the second side face.

5. The ball joint according to claim 4, wherein an arithmetic mean roughness of at least the portion of the bottom face exceeds 12.5 μm.

6. The ball joint according to claim 3, wherein an arithmetic mean roughness of at least the portion of the bottom face exceeds 12.5 μm.

* * * * *